(12) United States Patent
Saecker et al.

(10) Patent No.: US 8,007,569 B2
(45) Date of Patent: Aug. 30, 2011

(54) METHOD FOR REMOVING HYDROGEN SULPHIDE AND OTHER ACIDIC GAS COMPONENTS FROM PRESSURIZED TECHNICAL GASES

(75) Inventors: Georg Saecker, Dortmund (DE); Johannes Menzel, Waltrop (DE)

(73) Assignee: Uhde GmbH, Dortmund (DE)

( * ) Notice: Subject to any disclaimer, the term of this patent is extended or adjusted under 35 U.S.C. 154(b) by 1424 days.

(21) Appl. No.: 10/564,797

(22) PCT Filed: Jul. 12, 2004

(86) PCT No.: PCT/EP2004/007654
§ 371 (c)(1),
(2), (4) Date: May 12, 2006

(87) PCT Pub. No.: WO2005/007271
PCT Pub. Date: Jan. 27, 2005

(65) Prior Publication Data
US 2007/0131112 A1    Jun. 14, 2007

(30) Foreign Application Priority Data
Jul. 16, 2003  (DE) ................... 103 32 427

(51) Int. Cl.
*B01D 53/14*       (2006.01)
(52) U.S. Cl. .......... 95/163; 423/220; 423/226; 423/650; 423/655; 423/240 R; 423/242.1; 95/235; 95/236; 95/204; 95/174; 95/181; 95/183
(58) Field of Classification Search ............... 95/235, 95/230, 236, 159–161, 165–166, 171–183; 423/220, 240 R, 242.1
See application file for complete search history.

(56) References Cited

U.S. PATENT DOCUMENTS

| | | | | |
|---|---|---|---|---|
| 2,327,134 A * | 8/1943 | Schuftan | ...................... | 62/620 |
| 2,863,527 A * | 12/1958 | Becker et al. | .................. | 62/625 |
| 3,215,623 A * | 11/1965 | Hix | ............................. | 210/671 |
| 4,052,176 A * | 10/1977 | Child et al. | .................... | 95/161 |
| 4,155,987 A * | 5/1979 | Peterman et al. | .......... | 423/242.2 |
| 4,206,194 A * | 6/1980 | Fenton et al. | ............. | 423/576.5 |
| 4,241,032 A * | 12/1980 | Werner et al. | ................ | 423/226 |

(Continued)

FOREIGN PATENT DOCUMENTS

CA     2041157     11/1991

(Continued)

*Primary Examiner* — Duane Smith
*Assistant Examiner* — Ives Wu
(74) *Attorney, Agent, or Firm* — Marshall & Melhorn, LLC

(57) ABSTRACT

The invention relates to a method for removing hydrogen sulphide and other acidic gas components from pressurized technical gases by means of a physical detergent and for obtaining sulphur from hydrogen sulphide by using a Claus system. The hydrogen sulphide and the other acidic gas components are removed in an absorbent manner from the physical detergent, the physical detergent undergoes multi-step regeneration, said multi-step regeneration comprising at least one device for CO enrichment, a device for $H_2S$ enrichment, a device for $CO_2$ stripping and a device for thermal regeneration. The various regeneration steps consist of various pressure steps and have a lower pressure than that of the absorption. A hydrogen sulphide rich Claus gas is withdrawn from one of the regeneration steps and is guided to a Claus system where sulphur is produced. The residual gas exiting from the Claus system is hydrated and is condensed under pressure, corresponding to one of the regeneration steps. The condensed residual gas is guided into said device which is used for CO enrichment. Said device for CO enrichment can be embodied as a flash column.

2 Claims, 1 Drawing Sheet

U.S. PATENT DOCUMENTS

| | | | |
|---|---|---|---|
| 4,250,150 A * | 2/1981 | Karwat et al. | 423/226 |
| 4,254,094 A * | 3/1981 | Hegarty | 423/658.3 |
| 4,261,964 A * | 4/1981 | Scott et al. | 423/450 |
| 4,263,270 A * | 4/1981 | Groenendaal et al. | 423/574.1 |
| 4,324,567 A * | 4/1982 | Ranke et al. | 95/161 |
| 4,356,161 A * | 10/1982 | McNamara et al. | 423/230 |
| 4,425,317 A * | 1/1984 | Zeller et al. | 423/574.1 |
| 4,448,588 A * | 5/1984 | Cheng | 48/99 |
| 4,475,347 A * | 10/1984 | Hegarty et al. | 62/635 |
| 4,609,388 A * | 9/1986 | Adler et al. | 62/632 |
| 4,936,869 A * | 6/1990 | Minderman et al. | 48/77 |
| 5,607,594 A * | 3/1997 | Pohl et al. | 210/662 |
| 6,030,597 A * | 2/2000 | Buchanan et al. | 423/573.1 |
| 6,497,852 B2 * | 12/2002 | Chakravarti et al. | 423/228 |
| 6,517,801 B2 * | 2/2003 | Watson et al. | 423/574.1 |
| 6,884,282 B2 * | 4/2005 | Stevens et al. | 95/199 |
| 7,309,382 B2 * | 12/2007 | Cadours et al. | 95/172 |
| 2005/0132883 A1 * | 6/2005 | Su et al. | 95/235 |

FOREIGN PATENT DOCUMENTS

| | | |
|---|---|---|
| DE | 23 29 608 A1 | 1/1975 |
| EP | 0 455 285 B1 | 11/1991 |
| EP | 0 520 316 B1 | 6/1992 |

* cited by examiner

METHOD FOR REMOVING HYDROGEN SULPHIDE AND OTHER ACIDIC GAS COMPONENTS FROM PRESSURIZED TECHNICAL GASES

BACKGROUND OF THE INVENTION

The invention relates to a process for the removal of hydrogen sulphide and other sour gas components from industrial gases under pressure by means of physical scrubbing agents, to the recovery of sulphur from hydrogen sulphide using a Claus plant and to the reduction of CO emissions.

Sulphur components are selectively removed from industrial gases at elevated pressures (20 to 60 bar) using physically acting absorbents such as Rectisol, Selexol, Genosorb, Morphysorb, with due consideration for the potential presence of $CO_2$. Apart from the gas stream cleaned, the regeneration process also produces two regeneration gas streams at low pressure (1 to 3 bars) which contain the sour gas components removed: one stream laden with hydrogen sulphide and originating from a thermal regeneration column, one stream (or several streams) laden with carbon dioxide but almost free of hydrogen sulphide traces and originating from a non-thermal regeneration column, the carrier gas regeneration being effected, for instance, with the aid of nitrogen, and a further stream, if any, that is laden with carbon dioxide and originates from a flash column, without input of regeneration energy or regeneration carrier gas.

The stream laden with hydrogen sulphide is fed to the plant for the production of elemental sulphur by way of catalytic reaction in accordance with the Claus process. Apart from the elemental sulphur, this process yields a tail gas at almost atmospheric pressure (0.9 to 1.5 bar) that contains non-reacted sulphur components, such as hydrogen sulphide and sulphur dioxide, and hydrogen, carbon dioxide, carbon monoxide and nitrogen. In order to realise higher sulphur conversion rates (approx. >95%), the tail gas obtained in the Claus process is desulphurised by various methods in downstream units until the specified conversion rate is achieved, then subjected to a post-combustion and finally released into the atmosphere.

As an option, in accordance with the present state of technology, the tail gas obtained in the Claus process can first be fed to a catalytic hydration unit in which primarily sulphur dioxide as well as non-reduced sulphur components are converted to hydrogen sulphide, the said components being subsequently subjected to compression and recycled to the desulphurised main stream flowing to the absorption column at an elevated pressure of 20 to 60 bars or to the regeneration unit at a slightly higher pressure of about 1 to 3 bars. This recycling method of sulphur components not converted in the Claus process permits an almost 100-percent sulphur conversion of the sulphur components separated from the main gas stream.

The first disadvantage to be considered is the compression energy required for the tail gases, which is related to the high investment costs for compressors in order to cope with the rise in quasi atmospheric pressure to the 20-60 bar pressure of the main stream and specifically, the rise in pressure in the case of tail gas streams of small volumes and the choice of the adequate compressor type which must meet any operational requirement, for instance, that of existing traces of elemental sulphur.

In the second case, the disadvantage lies with the fact that the regeneration gas coming from the non-thermal regeneration column has a concentration that does not permit a non-polluting release of this stream into the atmosphere.

Hence, the objective of the invention is to improve the process in such a manner that on the one hand, the release of polluting off-gases into the atmosphere is avoided and on the other hand, a compression of the tail gas up to the pressure of the main gas stream is no longer required.

SUMMARY OF THE INVENTION

The objective of the invention is achieved by a method that provides for the removal of hydrogen sulphide and other sour gas components from industrial gases under pressure by means of physical scrubbing agents and for the recovery of sulphur from hydrogen sulphide using a Claus plant, implementing the steps listed below:

- the hydrogen sulphide and the other sour gas components are absorptively dissolved in a physically acting scrubbing agent;
- the physical scrubbing agent undergoes a multi-step regeneration;
- the multi-step regeneration unit be equipped with one device each for CO enrichment, $H_2S$ enrichment, $CO_2$ stripping and thermal regeneration;
- the various regeneration steps operate at pressure levels that differ from each other and are lower than that of the absorption unit;
- a Claus gas rich in hydrogen sulphide is withdrawn from one of the regeneration steps and fed to a Claus plant which produces sulphur;
- the tail gas leaving the Claus plant undergoes hydration;
- the Claus gas rich in hydrogen sulphide is withdrawn from the device for thermal regeneration;
- the hydrated tail gas is compressed and fed to the device for CO enrichment;
- a gas stream that is rich in CO and $CO_2$ is taken from a device for CO enrichment and
- a gas stream that is poor in CO and rich in $CO_2$ is taken from a device for $H_2S$ enrichment.

Further embodiments of the process provide for a design of the CO enrichment device as flash column and for a physical absorption process implemented as Rectisol, Selexol or Morphysorb process.

According to the invention, the tail gas originating from the Claus process and having undergone hydration is not added—as described above—to the main gas stream that must be desulphurised and has a pressure of 20 to 60 bars, but instead it is exclusively piped to the regeneration unit of the sour gas removing unit that is of the physically acting and selective type, i.e. the said gas being compressed to a pressure of only 2 and 10 bars, preferably 2 to 5 bars. The respective pressure level and the exact tie-in point in the CO enrichment device of the regeneration unit depend on the necessary or desired concentration of the gas components in the regeneration gases.

A pressure reduction that entails flash gas generation is used to remove CO that is still contained in the solvent. The pressure level in the regeneration unit, i.e. the absolute pressure in the flash column, if any, depends on the necessary CO removal from the solvent. An advantageous method is to release the CO contained in the tail gas from the Claus plant together with the CO still present in the solvent and with a portion of the flashed $CO_2$ via the column head, such that the $H_2S$ also contained in the off-gas from the Claus plant is re-absorbed in this step by the $CO_2$ rich solvent and the $CO_2/CO$ fraction thus is almost free of sulphur when it leaves this process step.

It is of major importance that the above described sulphur conversion of almost 100% of the sulphur components removed from the main gas stream be maintained and that the regeneration gases laden with carbon dioxide be free of hydrogen sulphide excepted some minor traces.

The advantage of the invention is that the tail gas leaving the Claus process need not be compressed to a high pressure since a gas scrubbing unit operating selectively with regard to hydrogen sulphide and carbon dioxide already encompasses enrichment columns specific to the individual gas components and operated at a low pressure level. Hence the tail gas can be tied in at the most suitable point without any change to the fringe conditions of the regeneration or absorption units.

A further advantage of the invention is that the integration of the tail gas into the flash column permits the production of a CO2 enriched regeneration gas with very low CO concentration in the downstream column operated with regeneration carrier gas.

BRIEF DESCRIPTION OF THE DRAWINGS

The invention is illustrated by means of a simplified process flow diagram (FIG. 1).

DESCRIPTION OF THE PREFERRED EMBODIMENT

Figure 1:
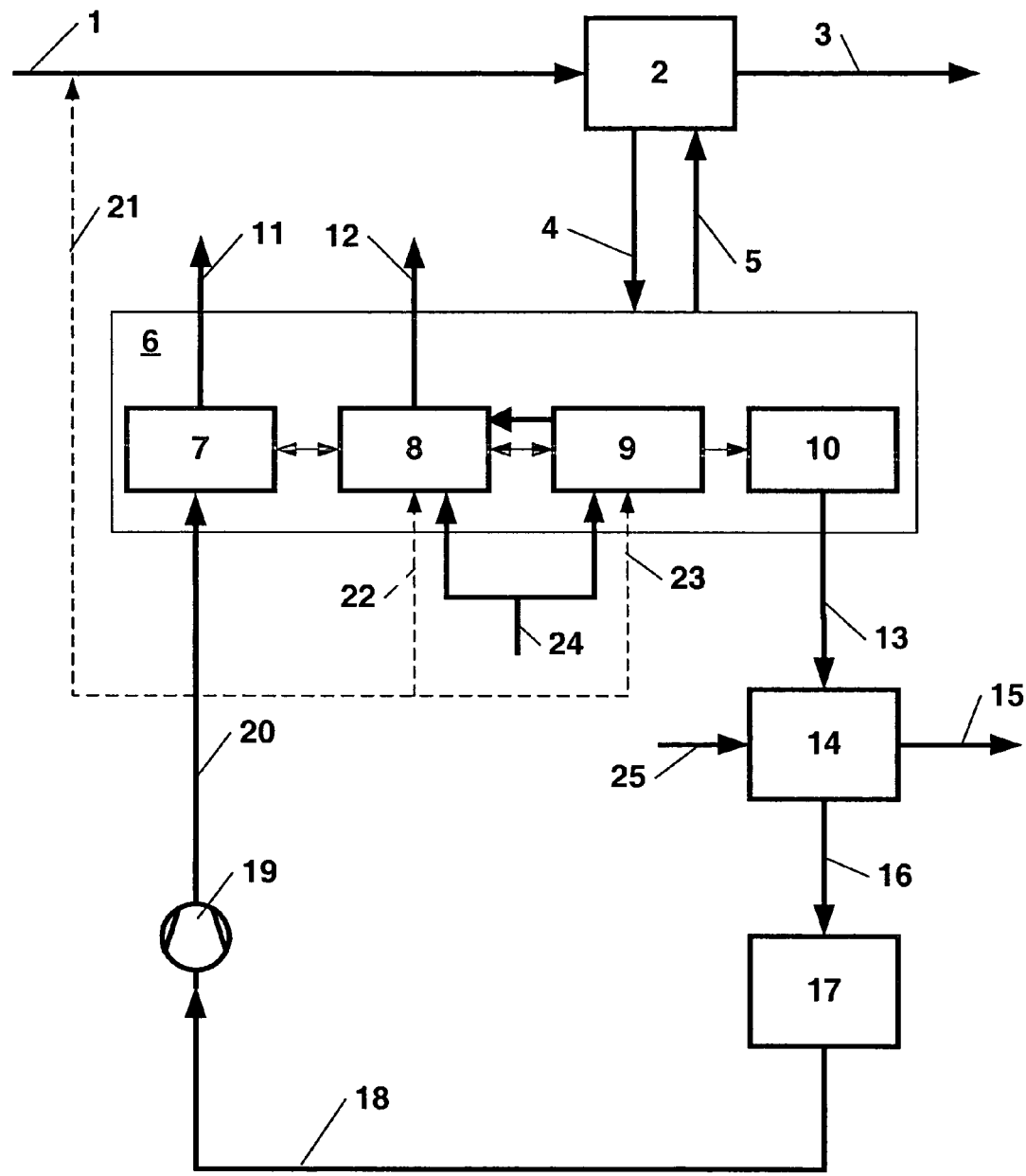
FIG. 1 shows the process according to the present invention implemented with the aid of a Rectisol process unit that consists of an absorption unit 2, a multi-step regeneration unit 6, a Claus plant 14 with downstream hydration 17, and a compressor 19, the process according to the present invention not being limited to this particular configuration used as an example.

Feed gas 1 with a pressure of 32.8 bars is piped to absorption unit 2 in which hydrogen sulphide and sour gas components such as $CO_2$ are removed. Cleaned product gas 3 leaves absorption unit 2. Laden absorbent 4 is sent to multi-stage regeneration unit 6 encompassing flash column 7, $H_2S$ enrichment device 8, $CO_2$ stripping device 9 and thermal regeneration unit 10, it is regenerated there and then recycled as regenerated absorbent 5 to absorption unit 2. Nitrogen 24 is piped to $H_2S$ enrichment device 8 and CO2 stripping device 9. Sour gas streams 11 and 12 contain sour gas components, in particular CO and $CO_2$ and inert gas in various chemical compositions, are free of or poor in sulphur components and suitable for further processing in other plant units. Sour gas stream 12 is especially poor in CO and thus suitable for a complete or partial release into the atmosphere.

Claus gas 13 separated in thermal regeneration unit 10 and laden with hydrogen sulphide as well as air 25 are fed to Claus plant 14 which produces sulphur. Tail gas 16 thus obtained undergoes hydration in hydration section 17 and hydrated tail gas 18 is compressed to a pressure of 2 to 5 bars by means of compressor 19.

Compressed tail gas 20 is piped to flash column 7 of regeneration unit 5 which uses the Rectisol process. It is no longer required to provide for a state-of-the-art feed (shown by a dashed line in FIG. 1) of stream 21 to feed gas 1 nor for stream 22 to $H_2S$ enrichment device 8 nor for stream 23 to $CO_2$ stripping section.

Two calculation examples based on a typical feed gas are used to demonstrate the advantages of the invention, the figures chosen complying with the system in FIG. 1 and the description. Table 1 reflects the operational mode described above. Table 2 compares a calculation example in which there is not a stream 20 to flash column 7 but instead a stream 22 sent to $H_2S$ enrichment device 8 and a stream 23 to $CO_2$ stripping section 9. It is revealed in this case that sour gas stream 12 is laden with a CO rate of 2.5.

TABLE 1

|  |  | Stream | | | | |
| --- | --- | --- | --- | --- | --- | --- |
|  |  | 1 | 3 | 11 | 12 | 13 |
| Total | kmol/h | 14978 | 9617 | 1156 | 4935 | 9.6 |
| throughput | kg/h | 357593 | 123959 | 49593 | 203983 | 3890 |
| CO | mol-% | 25.3 | 39 | 3.6000 | 0.0360 | 0 |
| $CO_2$ | mol-% | 35 | 0.1 | 94.7500 | 83.9700 | 63.2 |
| $H_2$ | mol-% | 37.5 | 58.3 | 1 | 0 | 0 |
| $N_2$ | mol-% | 1.6 | 2.4 | 0.65 | 14.894 | 2.4 |
| Ar | mol-% | 0.1 | 0.2 | 0 | 0 | 0 |
| $H_2S$ | mol-% | 0.2 | 0 | 0 | 0 | 31.5 |
| COS | mol-% |  | 0 | 0 | 0 | 1.4 |
| HCN | mol-% |  |  | 0 | 0 | 1.5 |
| S | mol-% | 0 | 0 | 0 | 0 | 0 |
| $O_2$ | mol-% | 0 | 0 | 0 | 0 | 0 |
| $H_2O$ | mol-% | 0.3 | 0 | 0 | 1.1 | 0 |
| CO | kmol/h | 3789.43 | 3750.63 | 41.62 | 1.78 | 0 |
| $H_2S$ | kmol/h | 29.96 | 0 | 0 | 0 | 30.3 |
| Temperature | °C. | 40 | 40 | 2.6 | 1.2 | 1.5 |
| Pressure | bars (abs) | 32.8 | 30.8 | 38 | 38 | 50 |

|  |  | Stream | | | |
| --- | --- | --- | --- | --- | --- |
|  |  | 15 | 20 | 24 | 25 |
| Total | kmol/h | 4 | 157 | 669 | 85.2 |
| throughput | kg/h | 965 | 5084 | 18748 | 2455 |
| CO | mol-% | 0 | 1.8 | 0 | 0 |
| $CO_2$ | mol-% | 0 | 38.6 | 0 | 0 |
| $H_2$ | mol-% | 0 | 4 | 0 | 0 |
| $N_2$ | mol-% | 0 | 45.8 | 100 | 79.6 |
| Ar | mol-% | 0 |  | 0 | 0 |
| $H_2S$ | mol-% | 0 | 1.3 | 0 | 0 |
| COS | mol-% | 0 |  | 0 | 0 |
| HCN | mol-% | 0 |  | 0 | 0 |

TABLE 1-continued

| | | | | | |
|---|---|---|---|---|---|
| S | mol-% | 100 | 0 | 0 | 0 |
| O$_2$ | mol-% | 0 | 0 | 0 | 20.4 |
| H$_2$O | mol-% | 0 | 8. | 0 | 0 |
| CO | kmol/h | 0 | 2.83 | 0 | 0 |
| H$_2$S | kmol/h | 0 | 2.04 | 0 | 0 |
| Temperature | °C. | 125 | 40 | 30 | 25 |
| Pressure | bars (abs) | 1 | 3 | 3 | 1 |

TABLE 2

| | | Stream | | | | |
|---|---|---|---|---|---|---|
| | | 1 | 3 | 11 | 12 | 13 |
| Total throughput | kmol/h | 14978 | 9617 | 1156 | 4935 | 96.2 |
| | kg/h | 357593 | 123959 | 49593 | 203983 | 3890 |
| CO | mol-% | 25.3 | 39 | 3.356 | 0.0934 | 0 |
| CO$_2$ | mol-% | 35 | 0.1 | 94.994 | 83.9126 | 63.2 |
| H$_2$ | mol-% | 37.5 | 58.3 | 1 | 0 | 0 |
| N$_2$ | mol-% | 1.6 | 2.4 | 0.65 | 14.894 | 2.4 |
| Ar | mol-% | 0.1 | 0.2 | 0 | 0 | 0 |
| H$_2$S | mol-% | 0.2 | 0 | 0 | 0 | 31.5 |
| COS | mol-% | | 0 | 0 | 0 | 1.4 |
| HCN | mol-% | | | 0 | 0 | 1.5 |
| S | mol-% | 0 | 0 | 0 | 0 | 0 |
| O$_2$ | mol-% | 0 | 0 | 0 | 0 | 0 |
| H$_2$O | mol-% | 0.3 | 0 | 0 | 1.1 | 0 |
| CO | kmol/h | 3789.43 | 3750.63 | 38.8 | 4.61 | 0 |
| H$_2$S | kmol/h | 29.96 | 0 | 0 | 0 | 30.3 |
| Temperature | °C. | 40 | 40 | 2.6 | 1.2 | 1.5 |
| Pressure | bars (abs) | 32.8 | 30.8 | 38 | 38 | 50 |

| | | Stream | | | |
|---|---|---|---|---|---|
| | | 15 | 20 | 24 | 25 |
| Total throughput | kmol/h | 4 | 157 | 669 | 85.2 |
| | kg/h | 965 | 5084 | 18748 | 2455 |
| CO | mol-% | 0 | 1.8 | 0 | 0 |
| CO$_2$ | mol-% | 0 | 38.6 | 0 | 0 |
| H$_2$ | mol-% | 0 | 4 | 0 | 0 |
| N$_2$ | mol-% | 0 | 45.8 | 100 | 79.6 |
| Ar | mol-% | 0 | | 0 | 0 |
| H$_2$S | mol-% | 0 | 1.3 | 0 | 0 |
| COS | mol-% | 0 | | 0 | 0 |
| HCN | mol-% | 0 | | 0 | 0 |
| S | mol-% | 100 | 0 | 0 | 0 |
| O$_2$ | mol-% | 0 | 0 | 0 | 20.4 |
| H$_2$O | mol-% | 0 | 8.5 | 0 | 0 |
| CO | kmol/h | 0 | 2.83 | 0 | 0 |
| H$_2$S | kmol/h | 0 | 2.04 | 0 | 0 |
| Temperatur | °C. | 125 | 40 | 30 | 25 |
| Druck | bar (abs) | 1 | 3 | 3 | 1 |

KEY TO REFERENCE DESIGNATIONS

1 Feed gas
2 Absorption
3 Cleaned product gas
4 Laden absorbent
5 Regenerated absorbent
6 Regeneration
7 Flash column
8 H$_2$S enrichment
9 CO$_2$ stripping
10 Thermal regeneration
11 Saur gas
12 CO poor saur gas
13 Claus gas
14 Claus plant
15 Sulphur
16 Tail gas
17 Hydration
18 Hydrated tail gas
19 Compressor
20 Compressed tail gas
21 State-of-the-art feed
22 State-of-the-art feed
23 State-of-the-art feed
24 Nitrogen
25 Air

The invention claimed is:

1. A process for the removal of hydrogen sulphide and other sour gas components from industrial gases under pressure by means of physical scrubbing agents and for the recovery of sulphur from hydrogen sulphide using a Claus plant, comprising:

absorptively dissolving the hydrogen sulphide and the other sour gas components in a physically acting scrubbing agent;

regenerating the physical scrubbing agent in a multi-step regeneration, wherein the multi-step regeneration unit is equipped with at least one device each for CO enrichment, $H_2S$ enrichment, $CO_2$ stripping and thermal regeneration;

operating the various regeneration steps at pressure levels that differ from each other and are lower than that of the absorption unit;

withdrawing a Claus gas rich in hydrogen sulphide from one of the regeneration steps and feeding it to a Claus plant which produces sulphur;

hydrating the tail gas leaving the Claus plant, wherein the Claus gas rich in hydrogen sulphide is withdrawn from the device for thermal regeneration;

the hydrated tail gas is compressed and fed to the device for CO enrichment;

a gas stream that is rich in $CO_2$, and enriched in CO relative to the hydrated tail gas is taken from a device for CO enrichment; and a gas stream that is poor in CO and rich in $CO_2$ is taken from a device for $H_2S$ enrichment.

2. The process according to claim 1, wherein a process implemented as physical absorption is based on the Rectisol, Selexol or Morphysorb process.

* * * * *